United States Patent

Heinke et al.

[11] Patent Number: 5,815,410
[45] Date of Patent: Sep. 29, 1998

[54] RATIO TYPE INFRARED THERMOMETER

[75] Inventors: Thomas Heinke, Santa Cruz; Jose Ysaguirre, Soquel; Steve King; Paul Carlson, both of Santa Cruz, all of Calif.

[73] Assignee: Raytek Subsidiary, Inc., Santa Cruz, Calif.

[21] Appl. No.: 643,222

[22] Filed: May 3, 1996

[51] Int. Cl.$^6$ .................................................. G01J 5/10
[52] U.S. Cl. ........................ 364/557; 374/121; 374/127; 374/131; 340/584; 340/600; 250/338.1; 250/338.3; 250/346; 250/339.01
[58] Field of Search ............................ 364/557; 324/115; 340/584, 600; 374/126, 128, 129, 130, 100, 133, 131, 121; 250/338.1, 338.3, 346, 339.01, 339.02, 339.04, 353, 340, 339.14, 341.5, 341.8, 345

[56] References Cited

U.S. PATENT DOCUMENTS

| | | | |
|---|---|---|---|
| 4,579,461 | 4/1986 | Rudolph | 374/9 |
| 4,634,294 | 1/1987 | Christol et al. | 374/170 |
| 4,986,672 | 1/1991 | Beynon | 374/131 |
| 5,099,121 | 3/1992 | Allen | 250/339 |
| 5,186,541 | 2/1993 | Paulk | 374/124 |
| 5,255,286 | 10/1993 | Moslehi et al. | 374/121 |
| 5,293,877 | 3/1994 | O'Hara et al. | 128/736 |
| 5,382,956 | 1/1995 | Baumgartner et al. | 341/155 |
| 5,507,576 | 4/1996 | Fally | 374/127 |
| 5,535,409 | 7/1996 | Larvoire et al. | 395/800 |
| 5,653,537 | 8/1997 | Ignatowicz et al. | 374/131 |

OTHER PUBLICATIONS

Lappe, Vern, "Applying Two–Color Infrared Pyrometry," *Sensors*, pp. 12–15, Aug. 1993.

*Primary Examiner*—Emanuel Todd Voeltz
*Assistant Examiner*—Tony M. Cole
*Attorney, Agent, or Firm*—Townsend and Townsend and Crew LLP

[57] ABSTRACT

An improved ratio type infrared thermometer utilizes integrating amplifiers for each waveband having the integration time automatically set so that the output voltage utilizes the full range of an analog to digital convertor. The gain and offset of the amplifiers is not ambient temperature dependent so accurate digital representations of the signal for each waveband are provided. The linearized output of each detector is optionally provided so that special or proprietary algorithms for computing the temperature of colored objects can be utilized. A special feature for downloading of updated new programs utilizes a "programming jumper" and an attenuation warning signal is provided for selected levels of attenuation.

4 Claims, 11 Drawing Sheets

RATIO TYPE INFRARED THERMOMETER

BACKGROUND OF THE INVENTION

The present invention relates generally to infrared thermometers and more particularly relates to improvements to ratio type infrared thermometers that determine the temperature of a remote object by measuring power emitted by the object in two different infrared wavebands.

Some ratio type infrared thermometers utilize two infrared sensitive photodetectors that function as a current source and that generate an output current which is a known function of the power incident on the photodiode. Other thermometers utilize different types of IR detectors.

One type of detector used in ratio type thermometers is a sandwich detector having two silicon photodiodes inside. A top diode is a very thin diode and is assembled over the bottom diode. The top diode, in addition to functioning as a photodiode, also functions as an optical filter to absorb IR radiation of selected wavelengths, e.g., short wavelengths, from reaching the bottom diode. Thus, the radiation reaching the bottom diode will have a different spectral composition than the radiation incident on the top diode. Therefore, the top and bottom diodes respond to radiation in two different wavebands.

Some existing ratio thermometers utilize logarithmic amplifiers to handle the large dynamic range of the photodiode detectors. The gain of the logarithmic amplifier is very dependent on the ambient temperature; however, because the algorithm for determining temperature uses the ratio of the outputs of the two amplifiers, the ambient temperature dependence is cancelled if the two amplifiers are at the same ambient temperature.

An advantage of a ratio thermometer is the ability to determine the temperature of a target object if the target is partially obscured and does not fill the field of view of the instrument or if the target is obscured in other ways, e.g., by a dirty window or particles floating in the air.

In a single waveband detector it is assumed that the target is a black body which completely fills the field of view, and the temperature is calculated accordingly. If the target were partially obscured then the radiation emitted would be decreased and the instrument would calculate a temperature that is lower than the actual temperature.

A ratio type thermometer will determine the correct temperature if the two IR wavebands are obscured the same amount and the obscuring artifact is not "colored" to selectively absorb certain IR wavelengths. However, even when using ratio detection it is possible that temperature measurement errors will exceed acceptable limits if too much of the target is obscured. Some existing ratio thermometers sense when the detector output signal level falls below a set magnitude or the attenuation exceeds a preset limit to display an error message and to shutdown to avoid taking erroneous measurements.

SUMMARY OF THE INVENTION

According to one aspect of the present invention, an improved ratio type infrared thermometer provides precise digital representations of the magnitude of the power incident upon the first and second detectors. These signals may be processed using any desired algorithm to determine the temperature of a target object.

According to another aspect of the invention, integrating amplifiers are coupled to the detectors to generate output signal voltage levels to be converted to a digital representation. The amplifiers are coupled to a timing unit that automatically and precisely controls the integration time to utilize the full resolution of an analog to digital convertor.

According to a still further aspect of the invention, the same time of integration is used for both integration channels to increase linearity.

According to a still further aspect of the invention, the non-linearities due to the photodetector diodes are corrected utilizing optical and digital signal processing techniques. Calibration data for each photodiode are stored in a look-up-table (LUT) and utilized to correct the digitized outputs from photodiode channels to provide nearly ideal output signals from each photodiode that can be utilized to calculate temperatures of colored target objects.

According to a still further aspect of the invention, new algorithms or calibration data can be downloaded into the ratio type thermometer by a user to customize or update the instrument.

According to a still further aspect of the invention, an attenuation warning signal is generated when the attenuation of the radiation emitted by the target object exceeds a warning level but the temperature continues to be measured until the attenuation factor exceeds a level sufficient to cause temperature measurement errors to exceed acceptable limits.

Other features and advantages of the invention will become apparent in view of the following detailed description and appended drawings.

Figure 6:
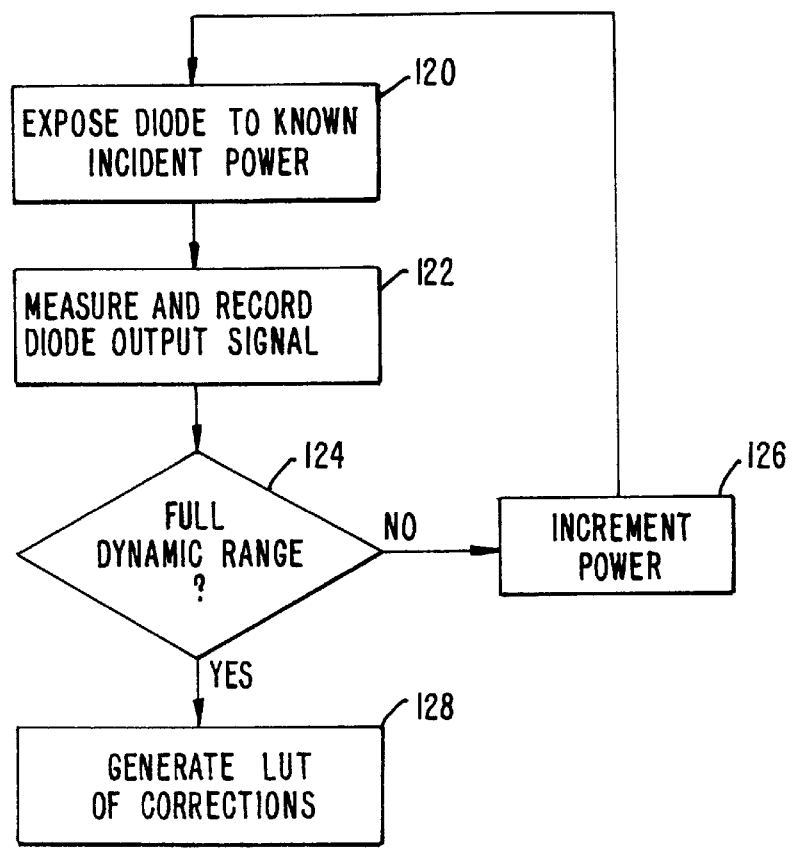
Figure 7:
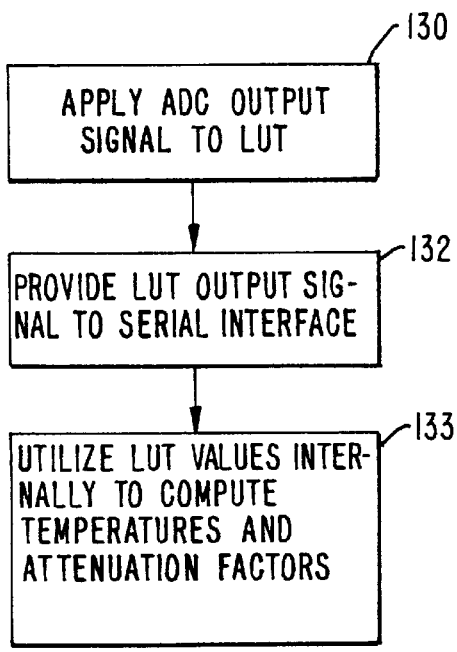
Figure 8:
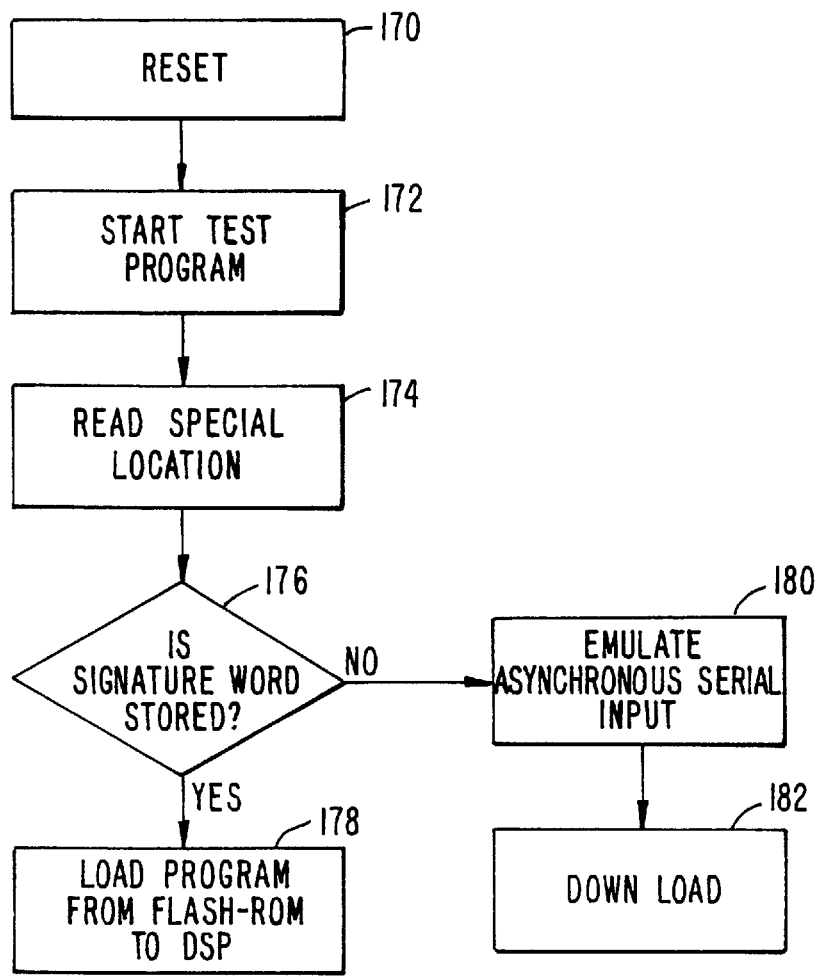
Figure 9:
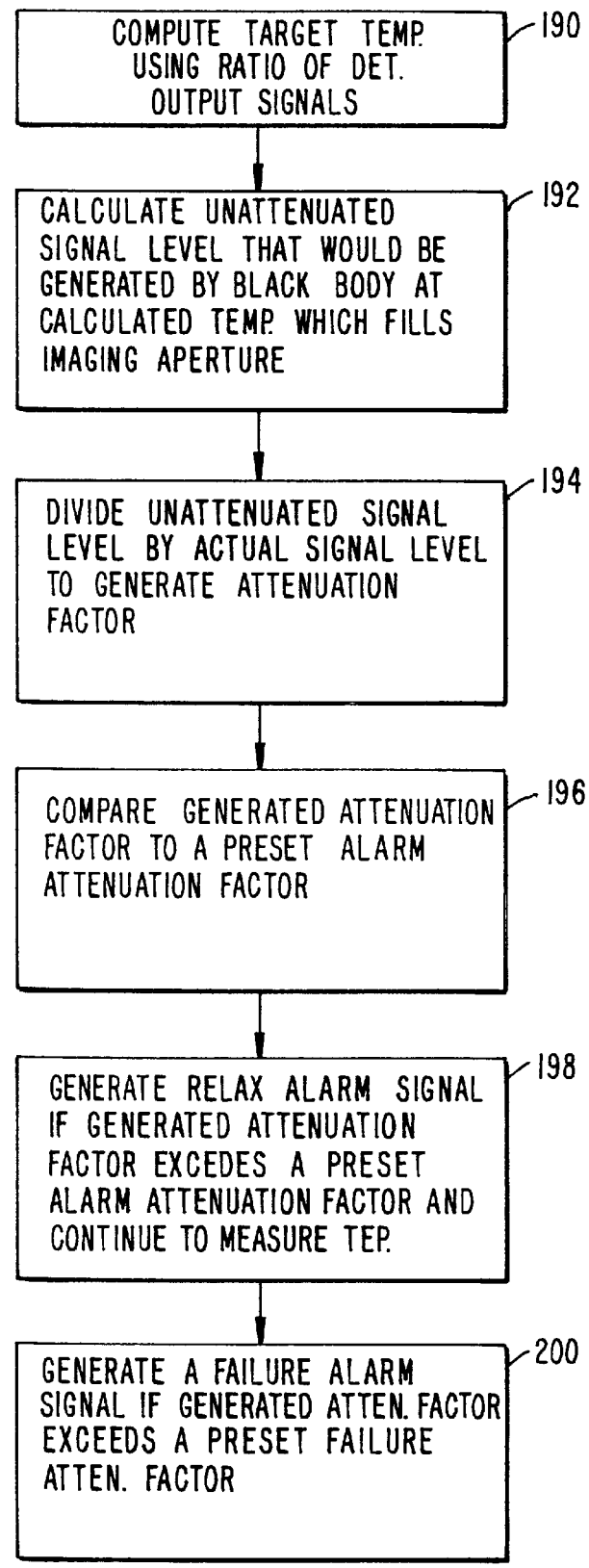

Fig. S is a set of graphs depicting the non-linear response of a photodiode;

FIG. 6 is a flow chart of a calibration procedure;

FIG. 7 is a flow chart of a correction procedure;

FIG. 8 is a flow chart of the downloading and updating procedure;

FIG. 9 is a flow chart of an attenuation warning procedure; and

Figure 10:
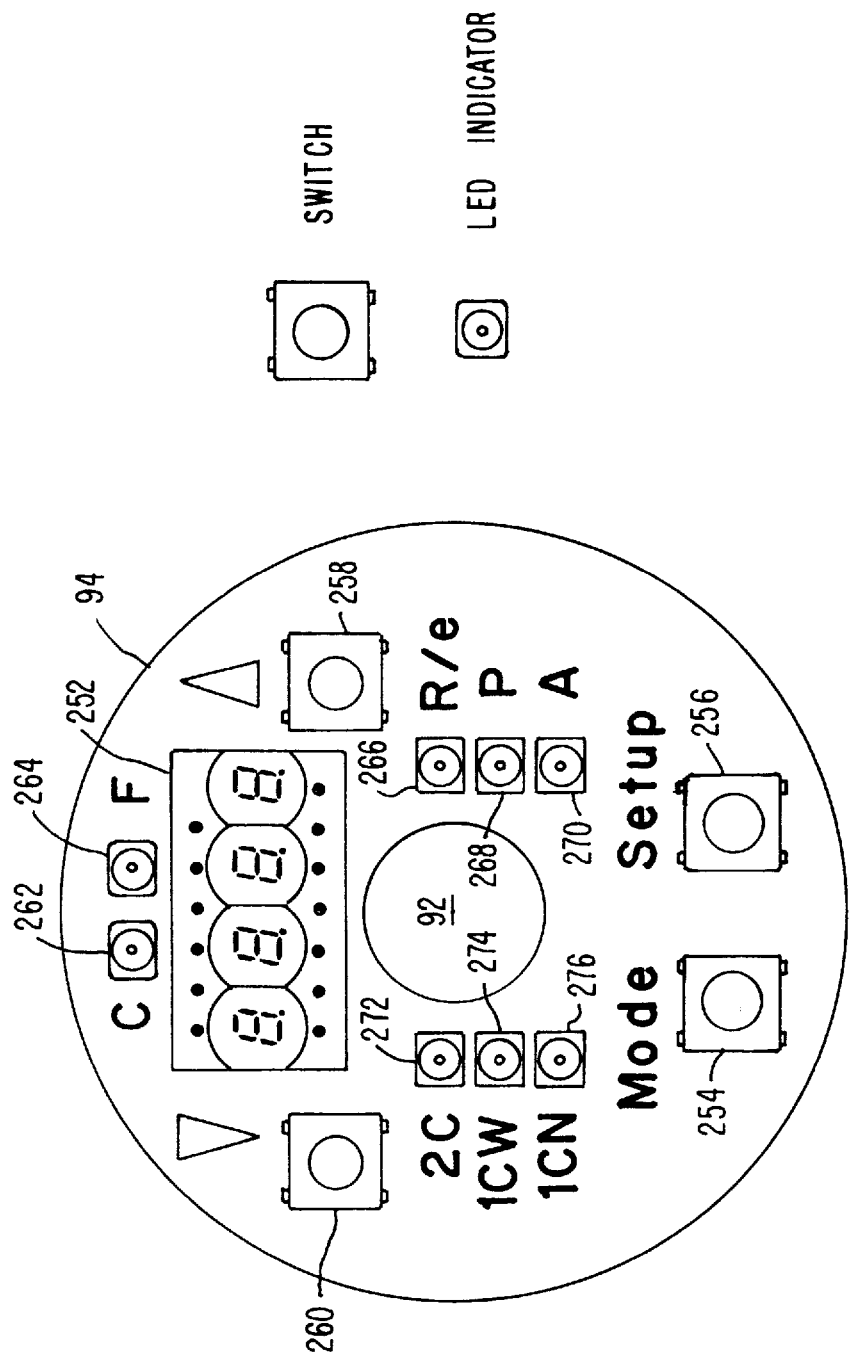

FIG. 10 is a plan view of the rear panel.

DESCRIPTION OF THE PREFERRED EMBODIMENT

Figure 1:
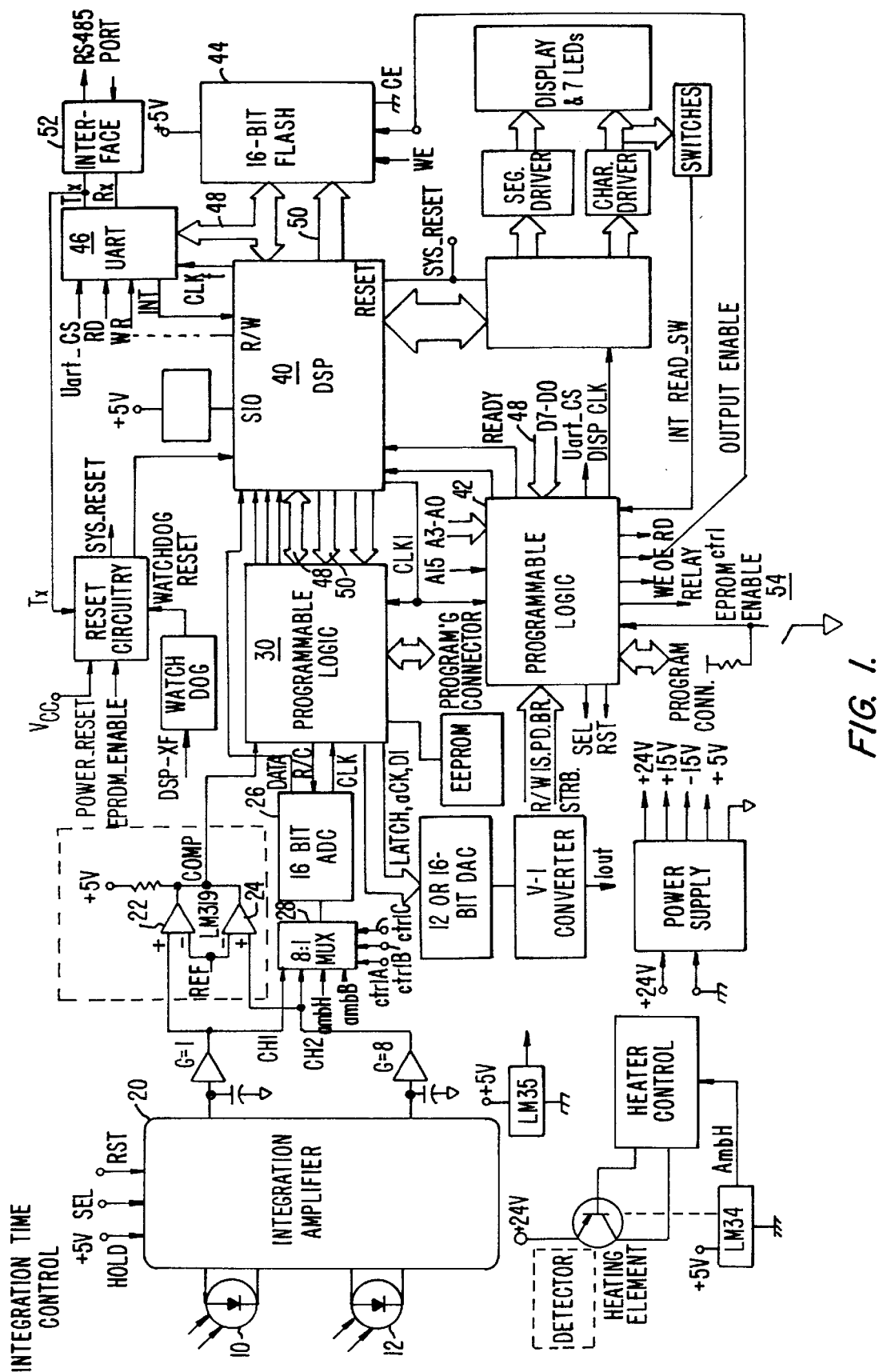
FIG. 1 is a high-level block diagram of a preferred embodiment of the invention.

FIG. 1 is a block diagram of a preferred embodiment of the system. The novel functions of various blocks will be described in detail below and those parts of the block diagram not relevant to the present invention will not be described in detail.

Referring to FIG. 1, the top and bottom photodiodes 10 and 12 are coupled to the dual integration amplifiers in module 20. The outputs of the integration amplifier are coupled to comparators 22 and 24 and to an ADC 26 through an MUX 28. The output of the ADC 26 and comparators 22 and 24 are coupled to inputs of a first programmable logic device (PLD) 30. A temperature control system 31 maintains the photodiodes 10 and 12 at a constant temperature.

A digital signal processor (DSP) 40 has its data and address ports coupled to the first PLD 30, a second PLD 42, a FLASH-ROM 44, and a UART 46 by data and address buses (DATA and ADD) 48 and 50. The Tx and Rx ports of UART 46 are coupled to an RS 485 port 52.

The FLASH-ROM includes an output enable (OE) signal input coupled to an OE signal output of the second PLD 42. A logical control input of the second PLD 42 is coupled to a jumper connection 54.

Figure 2:
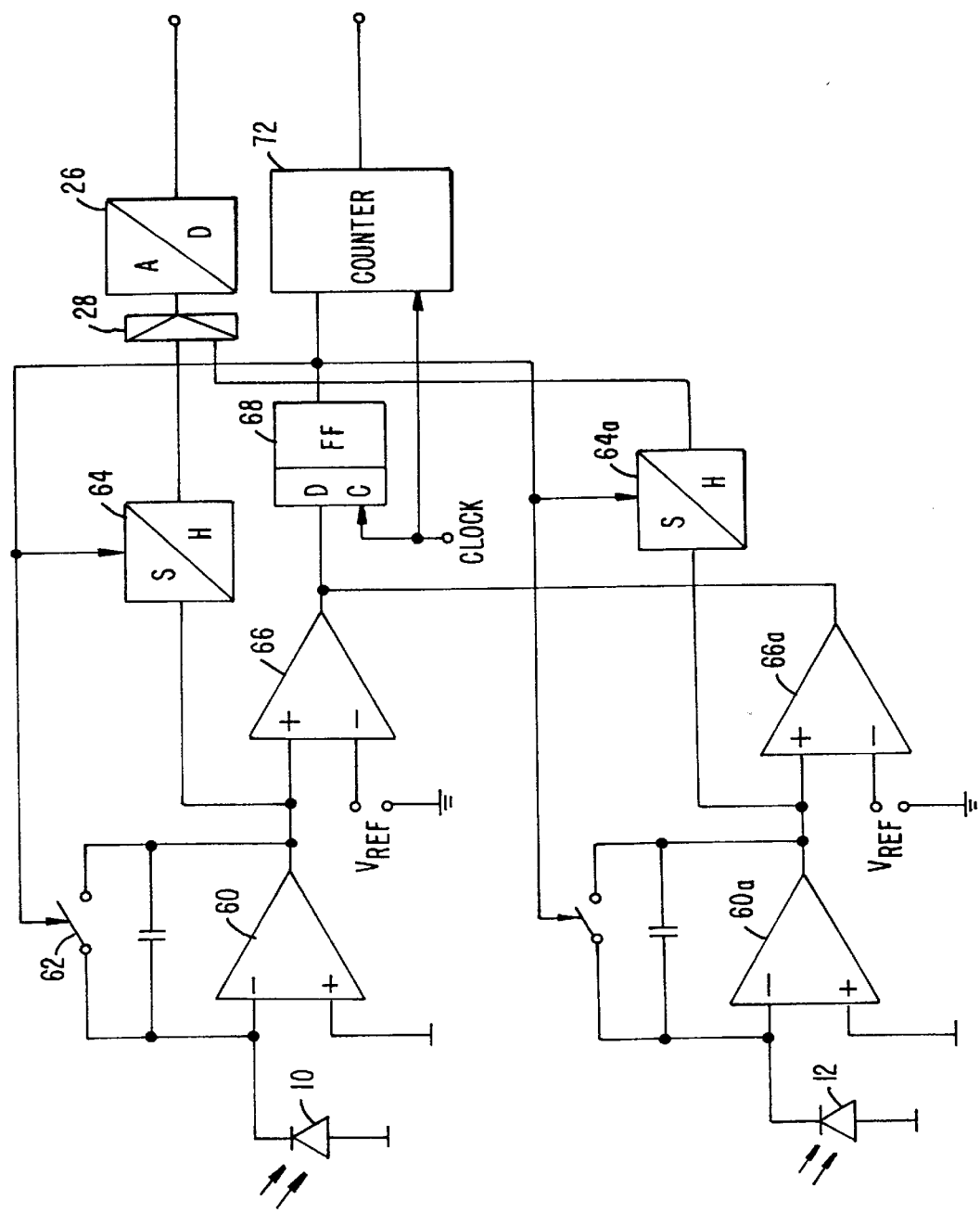
FIG. 2 is a schematic diagram of the photodiode channels.

FIG. 2 is a schematic diagram of the integration amplifier and timing unit utilized to generate digital representations of the magnitude of the detector output current signal. In FIG. 2, a first photodiode channel is depicted with the first photodiode 10 coupled to the inverting input of integrating amplifier 60. Integrating amplifier 60 includes a reset switch 62.

The output (VOUT) of the integrating amplifier 60 is coupled to the input of a sample and hold (S/H) circuit 64 and to an input of a comparator 66 having a second input coupled to VREF. The output of the comparator 66 is coupled to the data (D) input of a timing flip-flop (FF) 68 and the output of the S/H circuit 64 is coupled to the input of an analog to digital convertor (ADC) 26 through the MUX 28. A system clock signal (SCLK) is coupled to the clock input of the timing FF 68 and of a counter 72. The D output of the timing FF 68 outputs a timing signal and is coupled to the reset switch 62, the strobe input of the S/H circuit 64, and RESET/LATCH input of the counter 72.

The operation of the first photodiode channel will now be described. As is well-known, the integrating amplifier 60 integrates the input signal when the reset switch is closed. The gain of the amplifier is a function of the time of integration (T). Thus, the output voltage level is a measure of the amplitude of the input current signal if the time of integration is known.

The time of integration is determined by the comparator 66, timing FF 68 and SCLK. In addition to determining the time of integration the voltage level at which integration is terminated is determined by the magnitude of VREF. When VOUT exceeds VREF the comparator output is set. The timing signal generated by the timing FF 68 is then set in synchronism with the next SCLK pulse causing the counter to latch the number of SCLK cycles generated during the time of integration to precisely measure T. Additionally, the setting of the timing signal by the timing FF 68 causes the S/H circuit 64 to latch VOUT at time T and resets the integrating amplifier 60.

To further increase the accuracy of measurement the level of VREF is selected to be in the upper range of dynamic range of the ADC 26 to utilize the full range of the ADC 26. Additionally, because the counter output is not used as an indication of the magnitude of VOUT, a high frequency SCLK signal or a precise VREF is not required. The counter gives a precise measure of the absolute value of T which is used to accurately scale the output of the ADC 26 so that the digital representation indicates the magnitude of the input current signal generated by the first photodiode 10.

The integration and timing unit depicted in the top part of FIG. 2 is coupled to the output of a first photodiode 10. The bottom part of FIG. 2 depicts a second photodiode channel with a second photodiode 12 coupled to second integration circuit including a second integrating amplifier 60a, second comparator 66a, and second S/H circuit 64a. The output of the second S/H 64a circuit is coupled to the ADC 26 through the MUX 28.

The outputs of the first and second comparators 64 and 64a are coupled to the D input of the timing FF 68. Thus, the timing FF 68 triggers the timing signal when VOUT from either the first or second integrating amplifier 60 or 60a exceeds VREF. The timing signal output by the timing FF 68 is used to strobe the first and second S/H circuits 64 and 64a to hold the first and second VOUT signals, respectively, at time T and to reset the first and second integrating amplifiers 60 and 60a. Control signals switch the MUX 28 to alternately provide the VOUT signals from the first and second S/H circuits 64 and 64a to the ADC 70.

Thus, separate digital representations of the output current signals generated by the first and second photodiodes in response to different IR wavebands of the radiation emitted by a single target object are provided at the same time. The integrating amplifiers are not ambient temperature dependent so each representation is an accurate measure of the amplitude of the corresponding output current signals and can be processed to determine the temperature of the target objects.

Because the outputs of both comparators 64 and 64a are coupled to the D input of the timing FF 68, the same integration time, T, is used for both photodiode channels. The use of the same time of integration reduces the effects of non-linearity in the integration period. Also, since the attenuation of the two channels may be time dependent the use of the same time of integration provides for the simultaneous measurement of the two detector signals.

Non-linearities are also caused by the physical characteristics of the photodiode detectors 10 and 12. In the preferred embodiment the digital signals output by the first and second channels are linearized so that the first and second photodiodes function as radiometers in the form of ideal photodiodes. In an ideal photodiode the magnitude of output current (milliamps) is proportional to the magnitude of input power (watts/m$^2$). The linearization of the photodiode output is accomplished through a combination of optical and digital signal processing procedures.

Figure 3A:
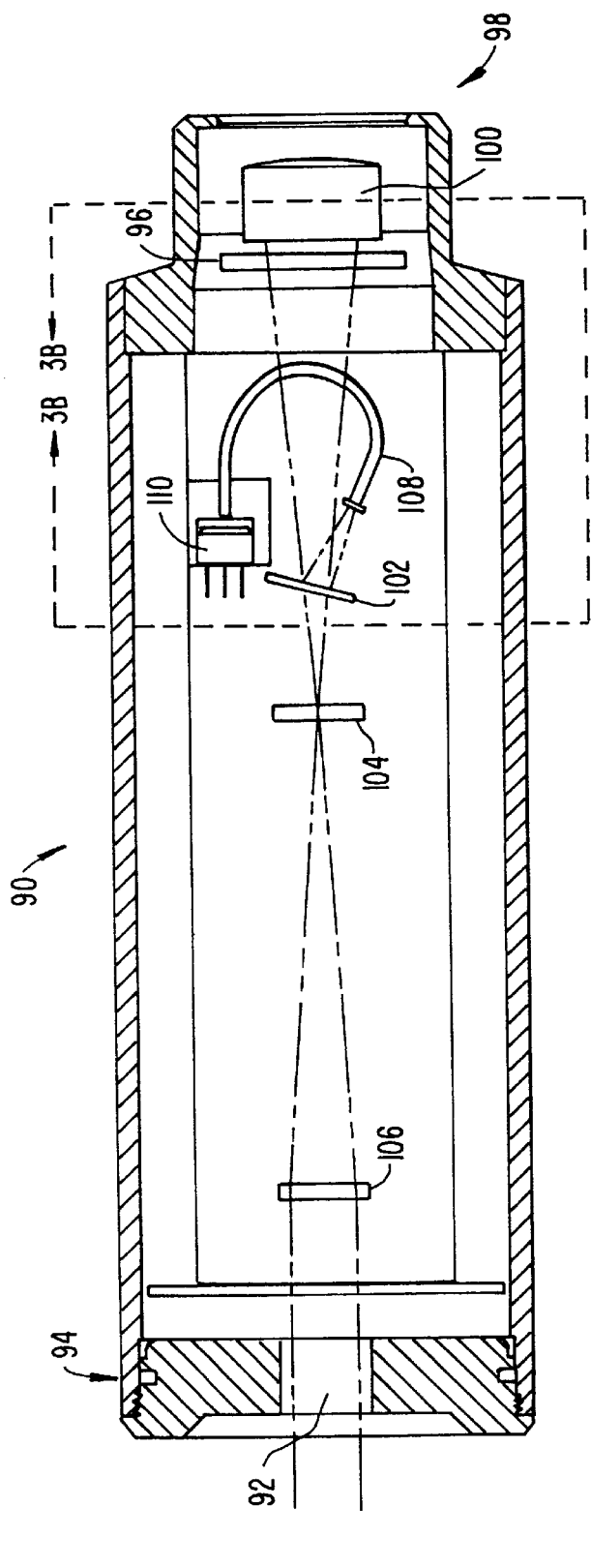
FIGS. 3A–B are cross-sectional diagrams of the ratio themometer instrument.

Turning first to the optical procedures, FIGS. 3A and B depict the optical system utilized in the preferred embodiment. In FIG. 3A, a cylindrical housing 90 has an eyepiece aperture 92 at a proximal end 94 and an optical window 96 at a distal end 98. Incoming radiation passes through an achromat 100, a beamsplitter 102, and eyepiece lenses 104 and 106. The beamsplitter 102 deflects a portion of the incoming radiation onto an optical fiber 108 which guides the deflected radiation to a sensor assembly 110 including the first and second photodiode detectors 10 and 12.

Figure 3B:
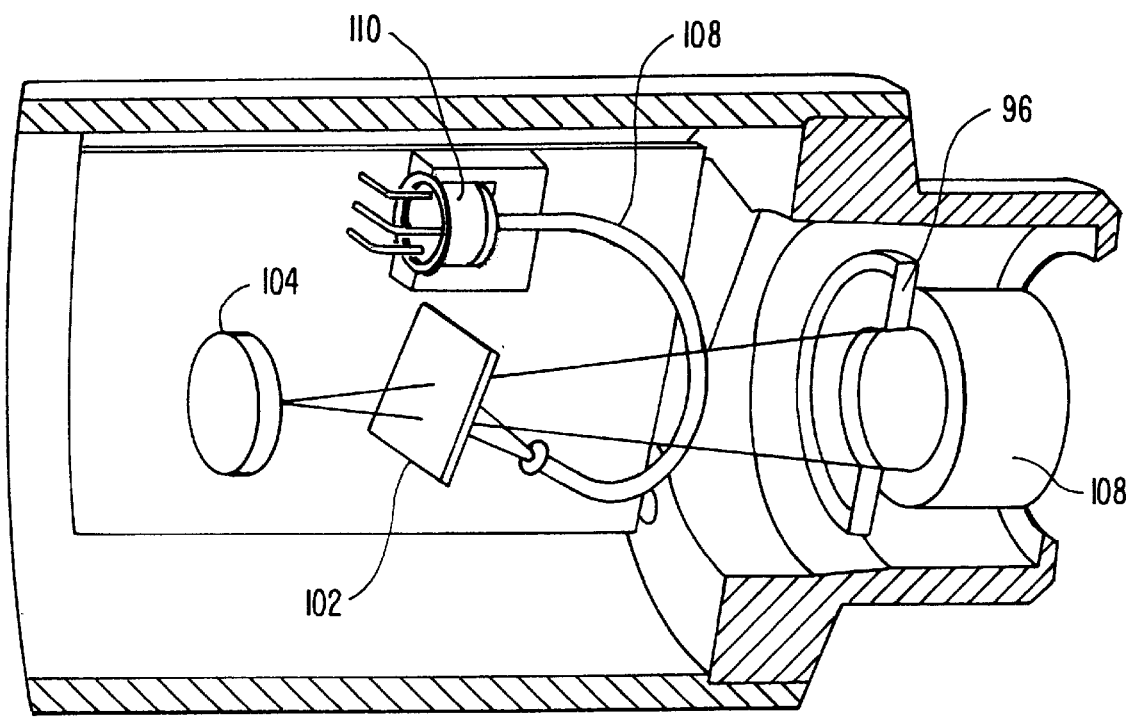

The operation of the infrared optics will now be described with reference to FIG. 3B. One cause of non-linearity are chromatic aberration effects. These effects due to the fact that, in a sense, two images of the target object are being measured, one in each of the two wavebands. The achromat 108 is specifically optimized for the two wavebands to limit the effect of chromatic aberrations.

Figure 4A:
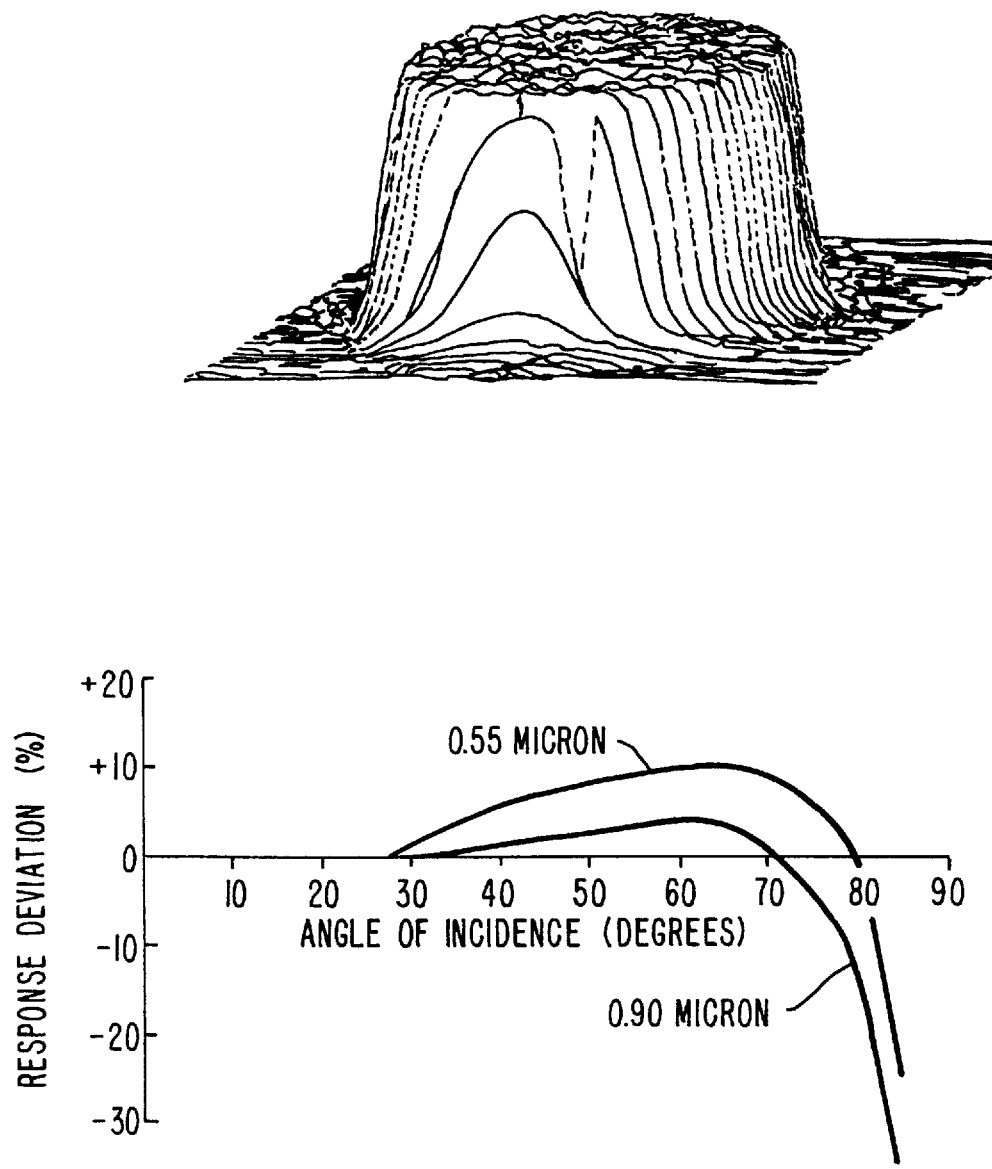
FIG. 4A is a set of graphs depicting the variations in sensitivity on the receiving surface of a photodiode.

Another cause of non-linearity are variations in the detector's responsivity across its sensitive area, where, in this case, both detectors 10 and 12 in the "detector sandwich" have this variation. This effect is depicted in FIG. 4A. The optical fiber 108 used in the preferred embodiment is a randomizing optical fiber including a large number of fine fibers mixing the image. The result is that any image upon any part of the measurement aperture will illuminate the entire sensitive area of the detector, greatly reducing the effects of the non-uniform response across the sensitive area of the detectors.

Figure 4B:
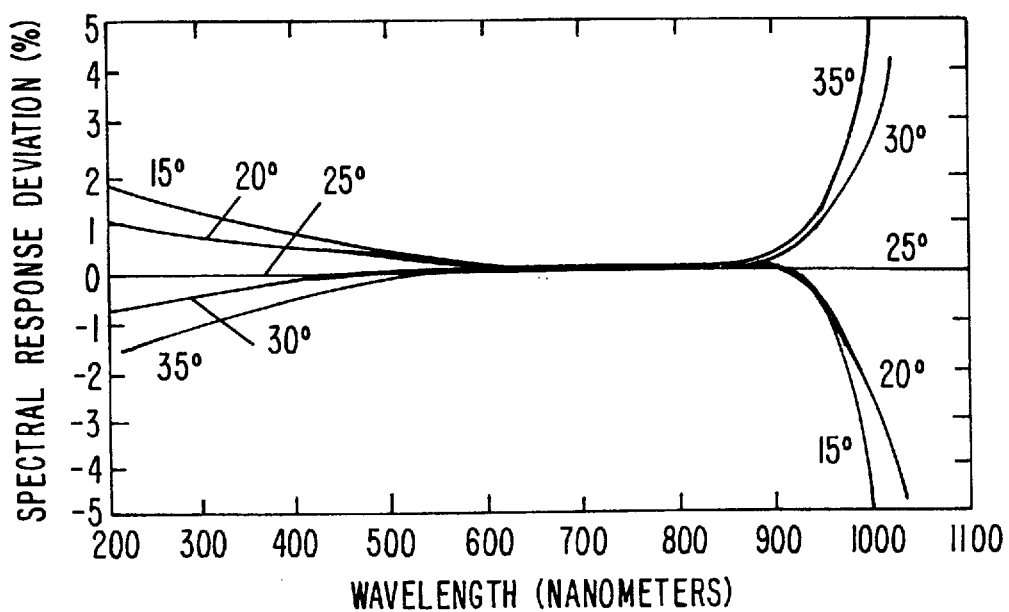
FIG. 4B is a set of graphs depicting the non-linear effect of temperature variation.

Another cause of non-linearity, depicted in FIG. 4B, is the temperature dependent responsivity of the photodiode detectors. In the preferred embodiment this dependence is controlled by temperature compensation system 31 which heats the photodiodes to about 65 degrees Centigrade to a stability of ±0.1 degrees C. Alternatively, the temperature could be measured and corrections applied digitally.

Figure 5:
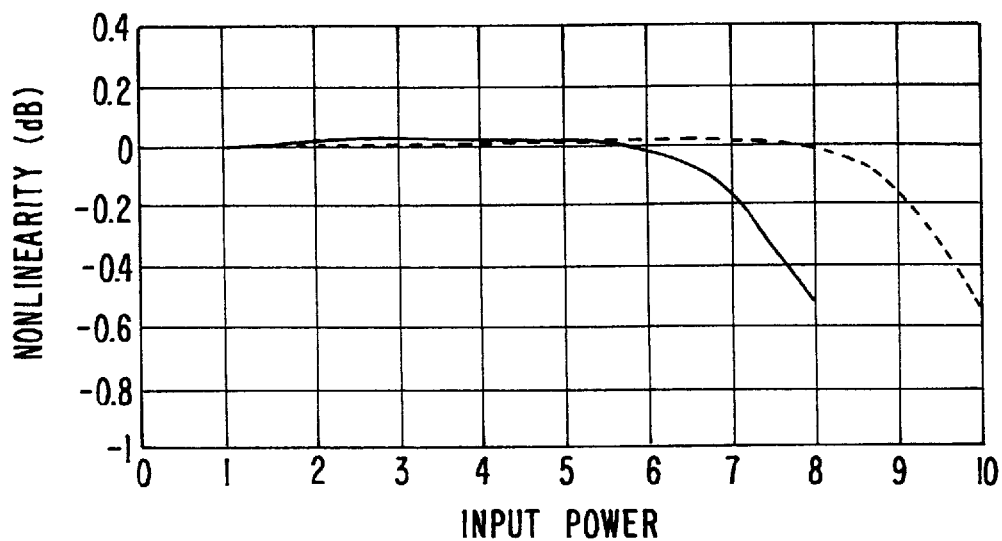
Figure 5:
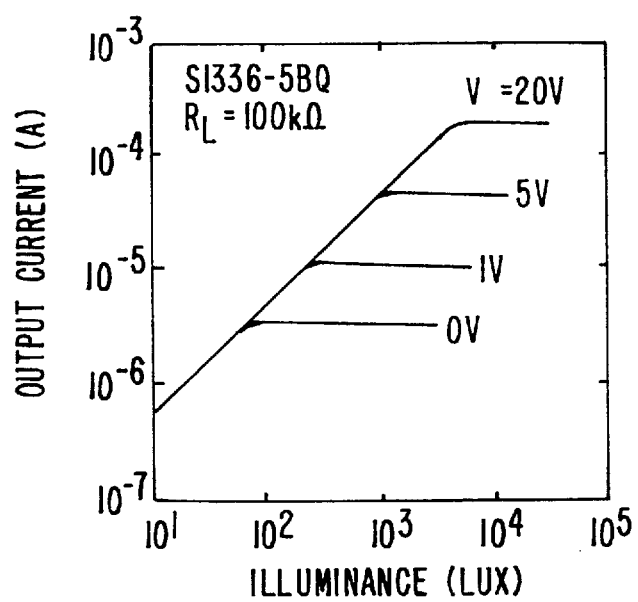

Another cause of non-linearity is due to the nonlinear output of a real photodiode when used over a broad dynamic range. This non-linear response is illustrated by the graphs in FIG. 5. A generic correction is inadequate because there is a significant difference in the non-linear characteristics of each detector.

FIG. 6 is a flow chart of a procedure for generating a correction look-up table (LUT) for a photodiode detector. The detector is exposed to a known incident power 120, the photodetector output is measured and recorded 122, and the measurements are continued over the full dynamic range 124 and 126. A correction LUT is formed 128 in the FLASH-ROM 44 having the actual photodiode digital output signals as address inputs and having the ideal photodiode response for the corresponding incident power stored at the addressed location.

The procedure for utilizing the correction LUT to linearize the digital representations output by the first and second photodiode channels is depicted in FIG. 7. The digital output of the ADC 26 is applied 130 to the LUT and the output signal of the LUT is provided 132 to the user through the serial interface.

Additionally, the linearized output values stored in the LUT are utilized 133 internally by the DSP 40 to calculate the temperature a target object and the attenuation factor.

Thus, digital signals emulating the response of an ideal photodiode responding the images of the target object are provided to the user. In some cases these signals can be successfully used to measure the temperature of a "colored" selectively absorbing surface that cannot be accurately measured by the ratio technique. Such applications are not uncommon in the metal or semiconductor industries and it would be a significant benefit if these measurement problems could be solved.

Many special algorithms have been developed for combining signals from plural detectors to compute surface temperature for specific applications. Some of these algorithms have been published and many are kept secret. Thus, the provision of highly linear signals from two detectors operating in different wavebands will provide the necessary information to utilize these algorithms and other algorithms to be developed.

In the preferred embodiment, the S/H circuits 64 and 64*a*, timing FF 68, and counter 72 are implemented on the first PLD 30 (FIG. 1). The separate linearized digital output signals are provided serially by the UART 46 and RS485 port 52.

Referring back to FIG. 1, the DSP 40 includes onboard RAM which can be used either as program memory or for data storage and an onboard ROM that holds a bootstrap program. The DSP 40 includes data and address inputs coupled, respectively, to the DATA bus 48 and ADD bus 50.

The FLASH-ROM 44 also includes data and address ports coupled to the DATA and ADD buses 48 and 50 and an output enable (OE) signal input. The FLASH-ROM is used to hold program and calibration data.

The second programmable logic device (PLD) 42 is coupled to selected lines of the ADD and DATA buses and also receives control signals from the DSP 40. The second PLD 42 has a logical control input coupled to the "programming jumper" 54 which is a switchable connection from the control logical input to ground.

The operation of a program downloading and updating system will now be described with reference to the flow chart depicted in FIG. 8. Normally, the jumper switch 54 is open and the logical control input is coupled to a high level through a pull-up resistor so that the second PLD 42 asserts the OE signal.

In that case, after RESET 170, the internal ROM on the DSP 40 is enabled and a small bootstrap program which can load an application from different sources is executed 172. Part of this program after RESET is to read 174 a special location in the FLASH-ROM 44 and to test 176 whether the external FLASH-ROM has a special signature word stored at a special location. If the test is passed then a certain range of the external FLASH-ROM is loaded 178 into the internal RAM of the DSP which is then configured as program memory and executed. This is the "normal" procedure after RESET.

If the special signature word is not read from the special location in the FLASH-ROM 44 then a program is not loaded from the external FLASH-ROM 44 and an asynchronous serial input on an input pin is emulated 180. A program can be downloaded 182 from an external source via this serial input into the RAM of the DSP which is configured as program memory. This is the download mode after RESET and is entered when the FLASH-ROM is empty because the special code will not be found at the special location when the test program is executed. The downloaded program can communicate with a PC to receive data for burning into the FLASH-ROM. The download mode is used during manufacture to download the program code and the calibration data.

The programming jumper 54 allows a special program to be downloaded or the FLASH-ROM 44 to be updated subsequent to the initial burn-in of the FLASH-ROM 44. If the programming jumper 54 is closed, the input signal to the logical control input of the second PLD 42 is low and the OE signal is held low while the test program first accesses the special location so that the special signature word cannot be read from the FLASH-ROM 44 even if it is stored there. Since the special signature word is not found the test program goes into the download mode where a serial download of a program is expected so that a program to overwrite the FLASH-ROM 44 can be downloaded. Once two accesses to the FLASH-ROM 44 by the DSP 40 have been attempted after RESET, the second PLD 42 is programmed to assert the OE signal regardless of the condition of programming jumper 54 to enable reading of the FLASH-ROM 44 for test purposes. It is only the access to the special location that must be blocked to enable the download mode.

A procedure executed by the DSP to generate an attenuation warning signal will now be described with reference to FIG. 8. In FIG. 8, the temperature of the target object is computed 190 using the ratio of the two photodiode output signal levels generated in response to the radiation emitted by the target object in first and second IR wavebands. The radiation that would be emitted by a black body at the computed temperature is calculated, and the unattenuated signal level that would be generated by the black body completely filling the imaging aperture is computed 192. The calculated unattenuated signal level is divided by the actual signal level generated to calculate 194 an attenuation factor.

For example, in the preferred embodiment the instrument is capable of calculating accurate temperature levels up to a failure attenuation factor of about of 100:1. However, the calculated attenuation factor is compared 196 to preset attenuation factors and a relay attenuation alarm is signaled 198 when the calculated attenuation exceeds a warning attenuation factor of 20:1 to allow a user to take remedial action, such as cleaning dirty windows, to avoid failure or a shutdown situation while the instrument continues to output an accurate temperature reading.

If the calculated attenuation factor exceeds the failure attenuation factor then a failure alarm is signaled 200 indicating that the instrument can no longer output accurate temperature reading.

Additionally, the magnitude of the calculated attenuation factor may be output through the serial interface 48 and 50 so that the user can determine whether to take remedial action to lessen the attenuation.

FIG. 10 depicts the rear panel 250 formed on the proximal end 94 of the tubular housing of the instrument. The eyepiece 92 is disposed in the center of the panel 25. A display 252, mode, setup, up, and down switches 254–260, and centigrade (C), fahrenheit (F), Ratio/emissivity (R/e), peak hold (P), average (A), two color (2C), one color wide (1CW), one color narrow (1CN) 262–276 are disposed on the panel. A twelve pin serial data connection and an analog connection (not shown) are disposed on the tubular body. In one mode both the ratio temperature and single detector temperature can be output through the serial data connection. The display 252 can be toggled between two temperatures.

The invention has now been described with reference to the preferred embodiments. Alternatives and substitutions will now be apparent to persons of skill in the art. Accordingly, it is not intended to limit the invention except as provided by the appended claims.

What is claimed is:

1. A measurement circuit comprising:

an integrating amplifier, having an input coupled to receive an input current signal, an output for providing an output voltage signal, a RESET input for receiving a RESET signal, said integrating amplifier for halting the integration of said input current signal when the RESET signal is asserted and for initiating the integration of said input current signal when said RESET signal is negated and for providing an output voltage signal having a magnitude equal the product of a constant, a time of magnitude T, and the magnitude of said input current signal, where T is time of integration;

a sample and hold circuit, having an input coupled to the output of said integrating amplifier, a strobe input coupled to receive a strobe signal, and an output for providing a sampled voltage level having a magnitude equal to the magnitude of said output voltage signal when said strobe is asserted, for sampling and holding the output voltage signal when the strobe signal is asserted;

an analog to digital convertor, having an analog signal input and a digital output, and characterized by a dynamic range, for converting the magnitude of said sampled voltage level to a digital representation;

a comparator, having a first input coupled to receive said output voltage signal, a second input for receiving a reference voltage signal having a magnitude in the upper range of the dynamic range of said analog to digital converter, and output signal for providing a COMP signal, said comparator for asserting said COMP signal when the magnitude of the output voltage signal is equal to the magnitude of the reference voltage signal;

a counter, having a clock input for receiving a clock signal consisting of a series of clock pulses separated by selected constant time duration, having a count output for providing a count signal, and having a start input for receiving a START pulse, said counter for counting said clock pulses when said START pulse is negated so that the count signal has a magnitude encoding the number of pulses counted and for terminating counting when said START pulse in asserted;

a flip-flop having a clock input coupled to receive said clock signal, a data input coupled to receive said COMP signal, and an output coupled to the RESET input of said integrating amplifier, the strobe input of said sample and hold circuit, and the START input of said counter, for asserting an FF output signal as said START pulse in coincidence with a first clock pulse received after assertion of said COMP signal to stop said counter to generate measured count signal and to sample and hold the output voltage signal so that the magnitude of the measured count signal precisely indicates the magnitude of T to facilitate accurate scaling of the digital representation of said output voltage signal to generate a digital representation of the magnitude of the input current signal; and a scaling unit for utilizing the magnitude of the count signal, the constant, and the digital representation of the magnitude of said sampled voltage level to generate a digital representation of the magnitude of said input current signal.

2. In an infrared thermometer comprising:

a detector assembly including first and second photodiodes, with the first and second photodiodes for receiving incident IR radiation in first and second different IR wavebands and for generating first and second output current signals indicating a magnitude of the intensity of radiation in the first and second IR wavebands, respectively, incident on the first and second photodiodes;

a first integrating amplifier, having an input coupled to receive the first output current signal, an output for providing a first output voltage signal, an RESET input for receiving an RESET signal, said first integrating amplifier for halting the integration of said first output current signal when the RESET signal is asserted and for initiating the integration of said first output current signal when said RESET signal is negated and for providing an output voltage signal having a magnitude equal the product of a constant, a time of magnitude T, and the magnitude of said first output current signal, where T is time of integration;

a first sample and hold circuit, having an input coupled to the output of said first integrating amplifier, a strobe input coupled to receive a strobe signal, and an output for providing a sampled voltage level having a magnitude equal to the magnitude of said first output voltage signal when said strobe is asserted, for sampling and holding the first output voltage signal as a first sampled voltage level when the strobe signal is asserted;

a first comparator, having a first input coupled to receive said first output voltage signal, a second input for receiving a reference voltage signal having a magnitude in the upper range of the dynamic range of said analog to digital converter, and an output signal for providing a first COMP signal, said comparator for asserting said first COMP signal when the magnitude of the first output voltage signal is equal to the magnitude of the output voltage signal;

a second integrating amplifier, having an input coupled to receive the second output current signal, an output for providing a second output voltage signal, an RESET input for receiving a RESET signal, said second integrating amplifier for halting the integration of said second output current signal when the RESET signal is asserted and for initiating the integration of said second output current signal when said RESET signal is negated and for providing an output voltage signal having a magnitude equal the product of a constant, a time of magnitude T, and the magnitude of said second output current signal, where T is time of integration;

a second sample and hold circuit, having an input coupled to the output of said second integrating amplifier, a strobe input coupled to receive a strobe signal, and an output for providing a sampled voltage level having a magnitude equal to the magnitude of said second output voltage signal when said strobe is asserted, for sampling and holding the second output voltage signal as a second sampled voltage level when the strobe signal is asserted;

a second comparator, having a second input coupled to receive said second output voltage signal, a second input for receiving a reference voltage signal having a magnitude in the upper range of the dynamic range of said analog to digital converter, and an output signal for providing a second COMP signal, said comparator for asserting said second COMP signal when the magnitude of the second output voltage signal is equal to the magnitude of the output voltage signal;

an analog to digital convertor, having an analog signal input and a digital output, and characterized by a dynamic range, for converting the magnitude of a provided sampled voltage level to a digital representation and for providing said digital representation as a digital ADC output signal;

a multiplexer, having first and second inputs coupled to said first and second sample and hold circuits to receive said first and second sampled voltage levels and having an output coupled to the analog signal input of said analog to digital convertor, for controllably providing either said first or second sampled voltage level as a provided voltage level to said analog to digital convertor;

a counter, having a clock input for receiving a clock signal consisting of a series of clock pulses separated by selected constant time duration, having a count output for providing a count signal, and having a start input for receiving a START pulse, said counter for counting said clock pulses when said START pulse is negated so that the count signal has a magnitude encoding the number of pulses counted and for terminating counting when said START pulse is asserted;

a flip-flop having a clock input coupled to receive said clock signal, a data input coupled to receive said first and second COMP signals, and an output coupled to the RESET input of said integrating amplifier, the strobe input of said sample and hold circuit, and the START input of said counter, for asserting an FF output signal as said START pulse in coincidence with a first clock pulse received after assertion of either said first or second COMP signal to stop said counter to generate measured count signal and to sample and hold the output voltage signal so that the magnitude of the measured count signal precisely indicates the magnitude of T to facilitate accurate scaling of the digital representation of said output voltage signal to generate a digital representation of the magnitude of the input current signal.

3. In a ratio type infrared thermometer having an imaging aperture, a method for providing a temperature output signal and for generating an attenuation warning signal comprising the steps of:

calculating a calculated temperature of a target object utilizing the ratio of first and second response signal levels generated in response to radiation emitted by said target object in first and second IR wavebands;

calculating a black body signal level that would be generated in response to radiation emitted by a black body in the first IR waveband, at the calculated temperature, that completely fills the imaging aperture;

calculating an attenuation factor being equal to the ratio of the level of the first ratio signal level and the black body signal level;

generating an attenuation warning when the attenuation factor is greater than a predetermined value; and continuing to provide said temperature output signal after the attenuation signal is generated.

4. The method of claim 3 further comprising the steps of:

providing the magnitude of said attenuation factor as an output of the ratio type infrared thermometer.

* * * * *